US009044998B2

(12) United States Patent
Mercat et al.

(10) Patent No.: US 9,044,998 B2
(45) Date of Patent: Jun. 2, 2015

(54) RIM OR RIM PORTION MADE OF COMPOSITE MATERIAL

(75) Inventors: Jean-Pierre Mercat, Chavanod (FR); Benoît Saillet, Albens (FR)

(73) Assignee: MAVIC S.A.S., Metz-Tessy (FR)

( * ) Notice: Subject to any disclaimer, the term of this patent is extended or adjusted under 35 U.S.C. 154(b) by 680 days.

(21) Appl. No.: 13/181,186

(22) Filed: Jul. 12, 2011

(65) Prior Publication Data

US 2012/0013172 A1    Jan. 19, 2012

(30) Foreign Application Priority Data

Jul. 13, 2010 (FR) ...................................... 10 02960

(51) Int. Cl.
*B60B 5/02* (2006.01)
*B60B 21/06* (2006.01)

(52) U.S. Cl.
CPC ............. *B60B 5/02* (2013.01); *Y10T 29/49526* (2013.01); *B60B 21/062* (2013.01); *B60B 2310/306* (2013.01); *B60B 2310/316* (2013.01); *B60B 2360/3414* (2013.01); *B60B 2900/325* (2013.01); *B60Y 2200/13* (2013.01)

(58) Field of Classification Search
CPC ................................. B60B 5/02; B60B 21/00
USPC ...................... 301/95.101, 95.102, 95.104, 99
See application file for complete search history.

(56) References Cited

U.S. PATENT DOCUMENTS

| 3,873,399 | A | | 3/1975 | Goldsworthy et al. | |
|---|---|---|---|---|---|
| 4,294,490 | A | * | 10/1981 | Woelfel | 301/64.703 |
| 4,702,528 | A | | 10/1987 | Sacks | |
| 4,938,540 | A | * | 7/1990 | Sacks | 301/99 |
| 5,127,980 | A | | 7/1992 | Cavin | |
| 5,350,221 | A | * | 9/1994 | Pearce et al. | 301/104 |
| 5,470,133 | A | | 11/1995 | Kuo et al. | |
| 5,653,510 | A | * | 8/1997 | Osborne | 301/30 |
| 6,048,035 | A | * | 4/2000 | Chen | 301/30 |
| 6,347,839 | B1 | * | 2/2002 | Lew et al. | 301/95.102 |
| 6,398,313 | B1 | * | 6/2002 | Lew | 301/95.102 |
| 6,991,298 | B2 | * | 1/2006 | Ording et al. | 301/30 |
| 7,427,112 | B2 | * | 9/2008 | Schlanger | 301/95.104 |
| 7,909,411 | B2 | * | 3/2011 | Mercat | 301/33 |
| 7,959,236 | B2 | * | 6/2011 | Mercat et al. | 301/95.102 |
| 8,002,362 | B2 | * | 8/2011 | Colegrove et al. | 301/95.103 |
| 8,066,922 | B2 | | 11/2011 | Jansen et al. | |
| 2004/0021366 | A1 | * | 2/2004 | Colegrove | 301/64.703 |
| 2011/0115280 | A1 | | 5/2011 | Mercat et al. | |

FOREIGN PATENT DOCUMENTS

| DE | 20 2005 006 589 U1 | 10/2005 |
|---|---|---|
| EP | 0 158 118 A2 | 10/1985 |
| FR | 2 256 656 A5 | 7/1975 |
| FR | 2 561 167 A1 | 9/1985 |
| WO | WO-2008/116560 A1 | 10/2008 |

\* cited by examiner

*Primary Examiner* — Paul N Dickson
*Assistant Examiner* — Timothy Wilhelm
(74) *Attorney, Agent, or Firm* — Greenblum & Bernstein, P.L.C.

(57) ABSTRACT

A wheel rim having an axis of rotation, the rim including a first element in the form of a section of a solid of revolution about the axis, made in a single unitary piece from composite material and including a first end and a second end distinct from one another. The first element is made by pultrusion and constitutes, between the first end and the second end, a section of a solid of revolution having an angular arc greater than 350°, the composite material of the first element includes fibers embedded in a thermosetting matrix, the fibers constituting at least 50% of the weight of the first element.

18 Claims, 10 Drawing Sheets

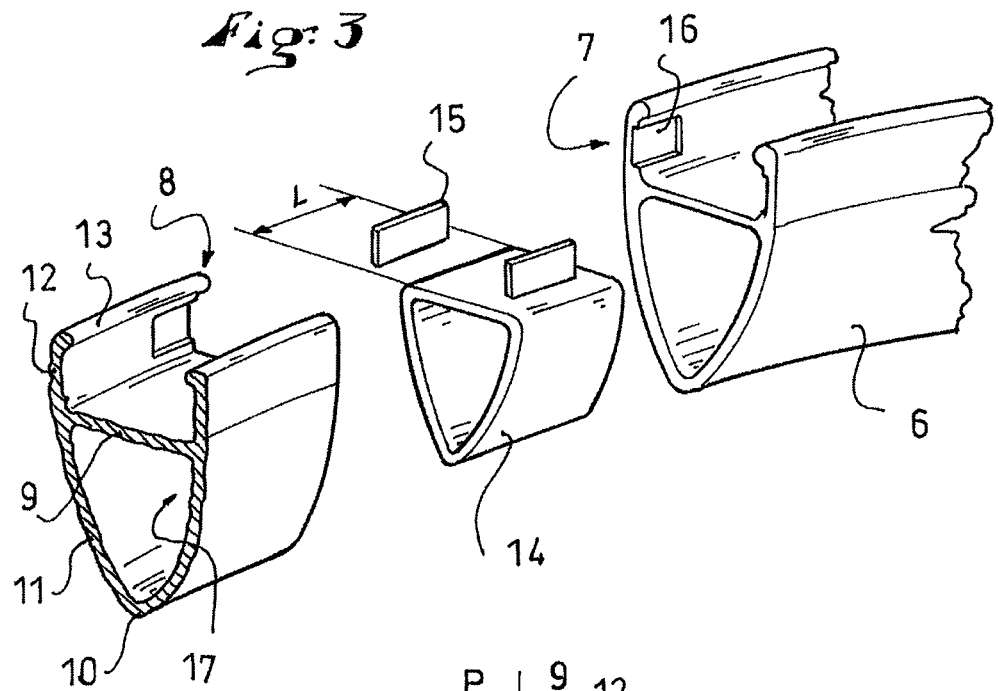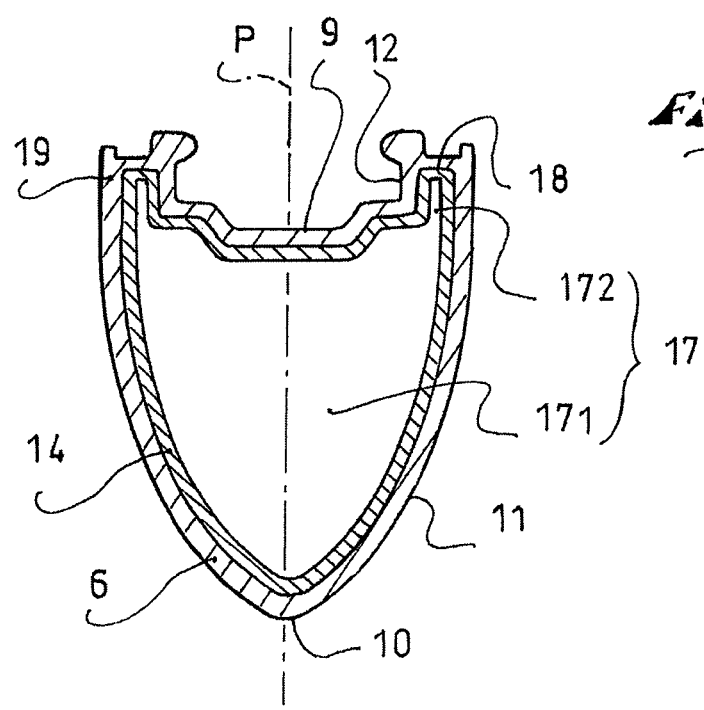

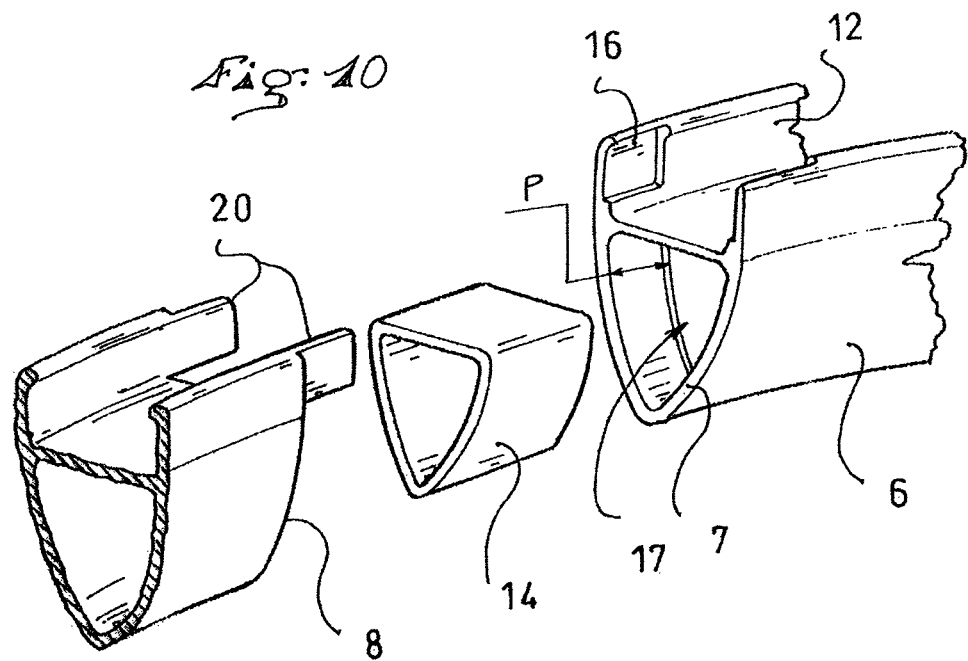
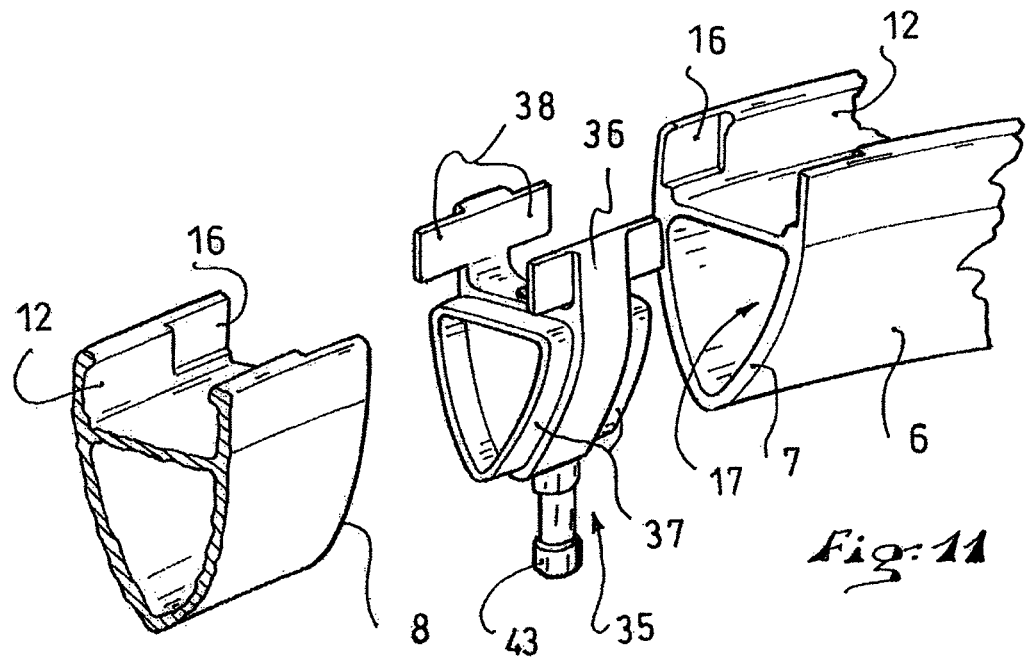

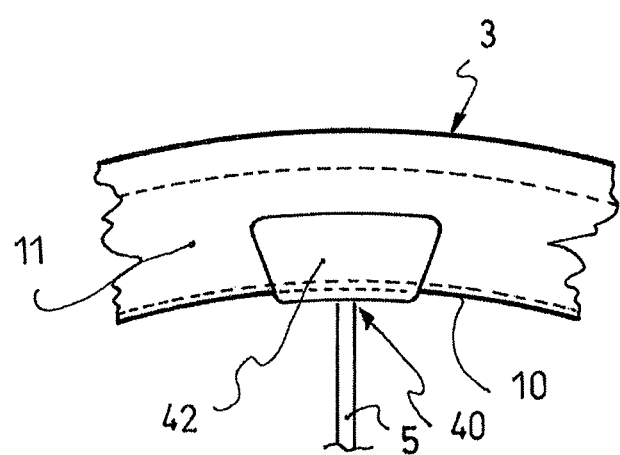

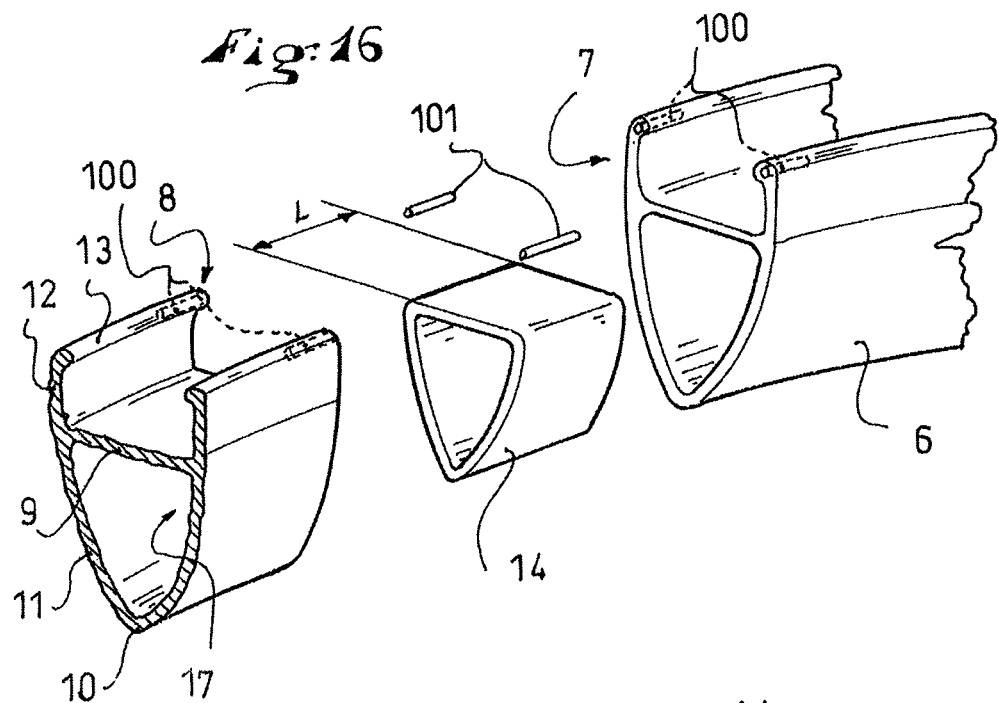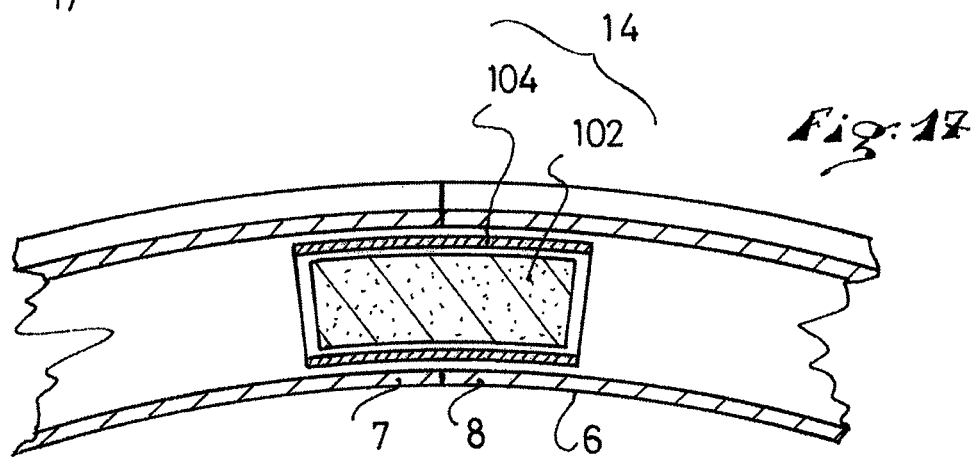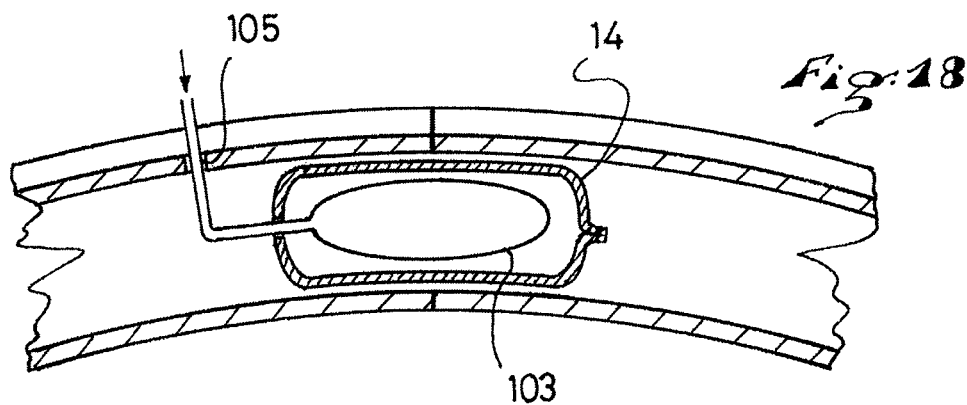

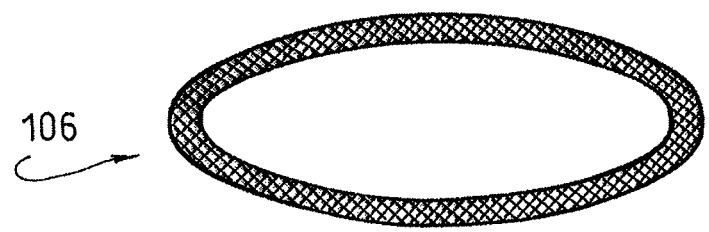
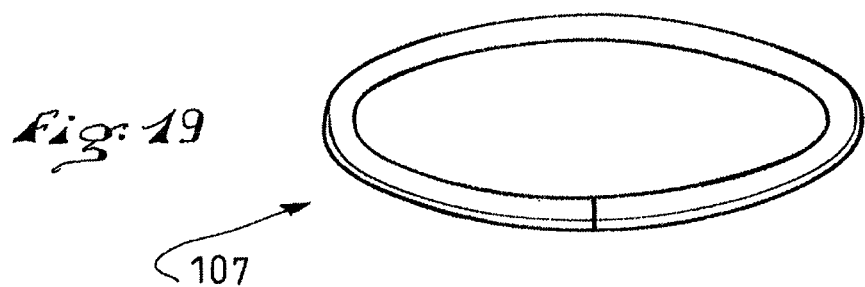
fig. 19
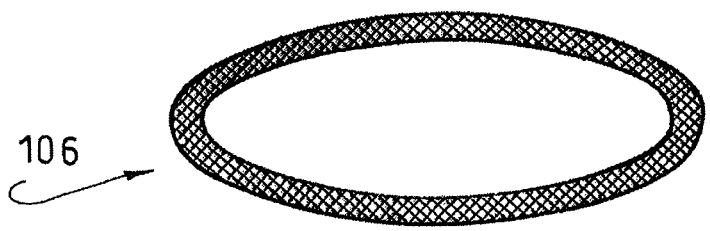
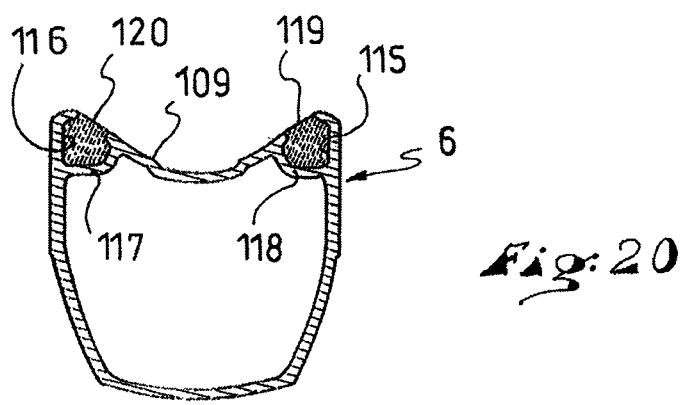
fig. 20

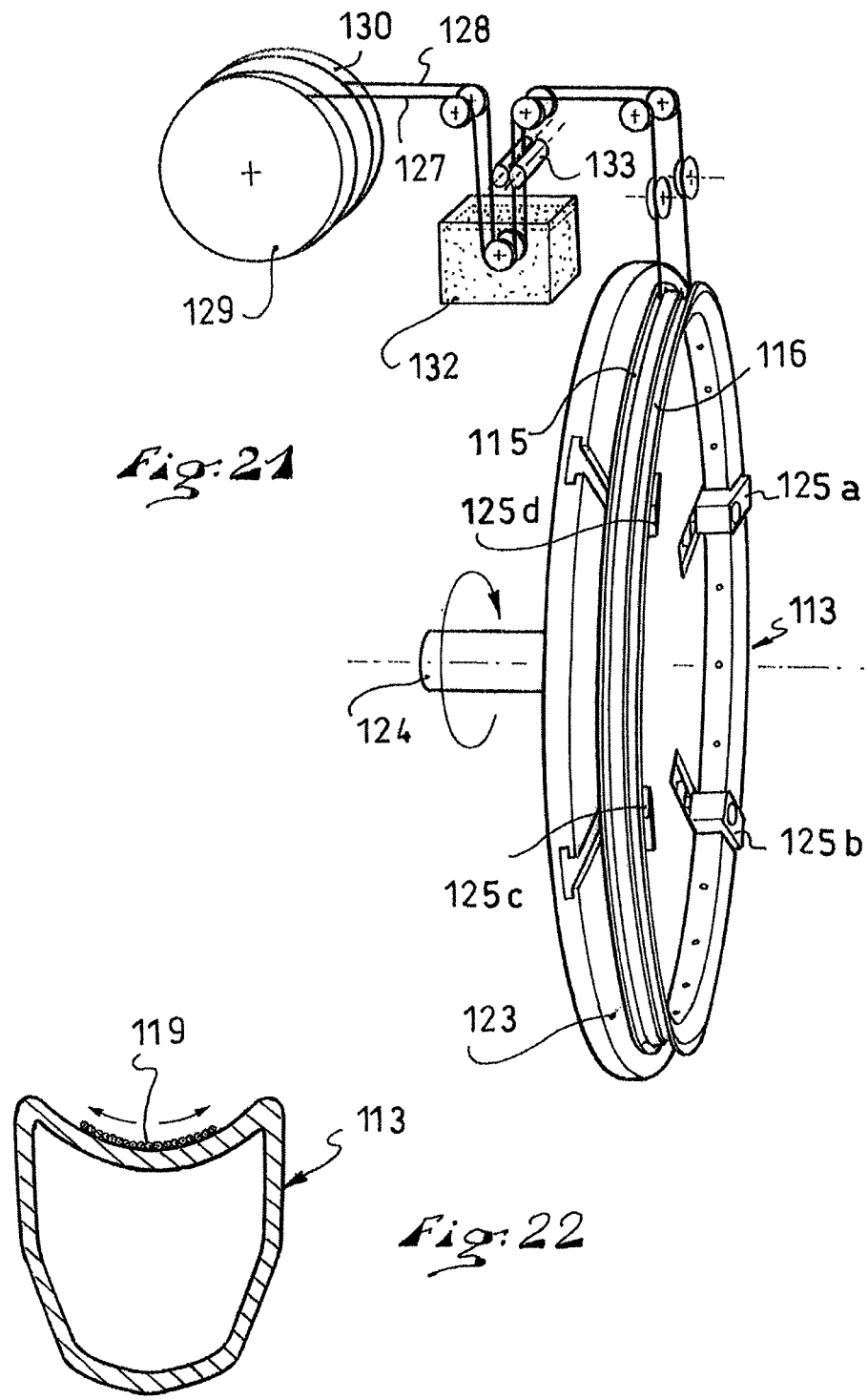

RIM OR RIM PORTION MADE OF COMPOSITE MATERIAL

CROSS-REFERENCE TO RELATED APPLICATION

This application is based upon French patent application No. 10/02960, filed Jul. 13, 2010, the disclosure of which is hereby incorporated by reference thereto in its entirety, and the priority of which is claimed under 35 USC §119.

BACKGROUND OF THE INVENTION

1. Field of the Invention

The invention relates to a rim, or to a portion of a rim, made of composite material.

2. Background Information

Initially, bicycle wheels were manufactured mostly out of metals such as steel and aluminum. A conventional method for manufacturing a metallic rim is to make a straight profiled section, to bend it, and then to weld its two ends together to obtain a hoop. Such a method is possible only because metallic materials have sufficient ductility.

Nowadays, rims are also made of composite materials. The rims, or portions thereof, made of composite material are very popular with cyclists for the stiffness/weight ratio that they offer.

A wide range of options are available in choosing the materials and the method for manufacturing a composite rim. For example, one can use glass, carbon, or aramid fibers, embedded in a matrix that can be either thermoplastic or thermosetting. In addition, one can choose fibers of various lengths, which can be arranged with respect to one another in various configurations.

For example, a combination of short fibers within a thermoplastic matrix enables a rim to be manufactured by injection. Such a method does not produce a rim element having a very good stiffness/weight ratio, particularly because the fibers used must be very short and the ratio of the quantity of fibers to the quantity of thermoplastic matrix is too small to allow full benefit from the advantages provided by the fibers.

One can also envision using woven fibers within a thermoplastic matrix to enable a manufacturing method similar to that used for metallic rims, i.e., making a rectilinear shaped element that is then bent under heat. Of course, such a method requires the use of a thermoplastic matrix. Moreover, as the glass or carbon fibers have a very high modulus and cannot stretch, such a method also requires a particular configuration for the fiber orientation. Typically, during the bending process it is impossible to bend an element whose fibers, positioned in a portion of such element, are oriented in a direction of the element corresponding to such portion and to the elongation direction. In addition, the deformation of a rectilinear shaped element for forming a circular hoop requires the fibers, which are non-extensible, to be small in quantity relative to the that of the matrix. Finally, obtaining a rim with a hollow profile using such a method cannot be envisioned.

It is now known that to make a composite rim with a very good stiffness/weight ratio, long fibers in large quantities should preferably be used and they should be positioned along all directions, particularly along a circumferential direction within a thermosetting matrix.

The manufacture of the aforementioned rims is expensive because of the cost of the materials, but also because of the significant amount of time required for their manufacture.

U.S. Pat. No. 6,347,839 describes a method for manufacturing a composite rim. The rim is comprised of twenty-four layers containing fibers, i.e., glass fibers. The various epoxy resin-impregnated layers are positioned in a mold on top of one another, thus forming a laminated fabric. After polymerization of the resin, the rim is extracted from the mold. A rim is advantageously made in a single piece, but the process is time-consuming and requires much manipulation. In addition, automating the positioning of the numerous layers in the mold is impossible. Therefore, the presence of an operator is required during the entire cycle for preparing a single rim.

Furthermore, this method makes it impossible to mold hollow elements, such as bicycle rims. Therefore, to overcome this difficulty, inner cores made of very light material are used, which remain in place once the rim is manufactured. Of course, such a solution is not optimal in terms of weight. In addition, to avoid crushing the core, which is often made of foam, the resin injection pressure is limited. Another solution to overcome this difficulty is to make the rim into a plurality of portions having annular and open shapes, which are glued to one another to form the final rim. This solution not only is costly in terms of time and materials, but is also inefficient because the rims thus made are heavier.

Another known method for making a rim is to use of an inflatable bladder. This method eliminates the need for the core, but remains a long and expensive process.

U.S. Pat. No. 6,398,313 describes another method in which the rim is comprised of two half-rims, each of which is a section having an angular arc of 180°. Each of the sections is made by molding. Due to this two-hemisphere configuration, the closed cross-sectional portions of the rim are now hollow portions of the sections, which are open at both ends of the sections. For the molding, it is therefore possible to use a harder, extractable core, and higher pressures are possible. The two junctions between the sections are made by positioning sleeves within the rim. Due to the presence of these two sleeves, this technology does not make it possible to produce weight-optimized rims.

Furthermore, this method remains a long and costly process. Indeed, as is the case with all methods for molding a composite structure comprised of various layers, the positioning of the layers in the mold generates a large amount of waste because the layers are cut from fabric panels of standard size prior to being inserted into the mold. In addition, the molding processes also generate a waste of resin that is difficult to recycle as it is already polymerized. Therefore, in addition to the disadvantages related to the cost and the manufacturing time, molding a composite rim also poses environmental problems.

SUMMARY

The present invention provides a rim, or a rim portion, that is to say an element to be used in the manufacture of such a rim, and which does not have the disadvantages of the prior art.

In particular, the present invention provides for the production of a lightweight and strong rim comprising composite materials, such as fabrics comprised of fibers embedded in a polymerizable resin matrix.

In these regards, the invention provides for a wheel rim having a rotational axis, a first element in the form of a section of a solid of revolution extending about such axis and made of composite materials in a single unitary piece and having a first end and a second end separate from one another. The first element constitutes, between the first and second ends, a section of a solid of revolution having an angular arc greater than 350°, the composite material of which the first element includes embedded fibers, the fibers constituting at least 50% of the weight of the first element.

In certain embodiments of the invention the rim includes, in addition to the characteristics mentioned in the preceding paragraph, any technically possible combination of the following characteristics:

the composite material of which the first element includes a thermosetting matrix;

the element is made by pultrusion;

one of the cross-sectional portions of the rim is a closed portion; assembly is completed with any of glue, a sleeve inserted into the closed cross-sectional portion, a reinforcing band, and a pin;

the rim includes a second element in the form of a section of a solid of revolution about an axis, made of composite materials in a single unitary piece, a first end and a second end of which, distinct from one another, are separated by an angular arc greater than 350°;

the first end and the second end are machined in a complementary fashion so as to enable them to nest into one another and to provide closure of the rim; and the rim includes a first element forming a core produced by pultrusion, and a structural skin at least partially covering the core.

A rim comprising an element of this type, made in a single composite piece constituting the entirety or substantially the entirety of the rim circumference, makes it possible to manufacture, at low cost, a rim whose stiffness/weight ratio is maximal. In addition, the choice of a fibers/resin ratio greater than 50%, especially for carbon fibers, further improves the stiffness/weight ratio.

The invention also includes a method for manufacturing a rim, such method including pultruding at least one element to the form of a section of a solid of revolution about an axis, made of composite material, such element comprising a first end and a second end and constituting, between these two ends, a section of a solid of revolution having an circular arc greater than 350°; preparing a rim blank from at least such an element, this preparation being capable of including additional machining; preparing to assemble together the two ends of the blank, and assembling the two ends of the blank.

In certain embodiments of the invention, the method can include all or lesser combinations of the following:

preparing the assembly includes the manufacture of a sleeve if the blank includes a hollow body;

preparing the assembly includes the preparation of reinforcements to be positioned on the lateral sides of the blank;

the assembly of the two ends is carried out by gluing;

the assembly of the two ends is carried out by co-lamination;

preparing the blank includes machining the lower bridge in the zones between the anchoring points of the spokes;

preparing the blank includes drilling the lips for positioning the pins;

preparing the blank includes reinforcing the anchoring points of the spokes by positioning reinforcing panels; and the blank is covered with layers of composite fabric in order to obtain the final rim.

BRIEF DESCRIPTION OF DRAWINGS

Other characteristics and advantages of the invention will be more apparent from the description that follows, with reference to the annexed drawings illustrating, by way of non-limiting embodiments, how the invention can be embodied, and in which:

FIG. 3 is a perspective view of the rim of the first embodiment before assembly;

FIG. 4 is a cross-sectional view of a rim according to a second embodiment of the invention;

FIGS. 9, 10, and 11 are perspective views of a rim according to a sixth, seventh and eighth embodiment, respectively, of the invention;

FIGS. 13, 14, and 15 are views showing supplemental and optional details of manufacturing a rim according to the invention;

FIG. 16 is a perspective view of a rim according to an alternative of the first embodiment of invention;

FIGS. 17 and 18 are longitudinal cross-sectional views of a rim according to a ninth and tenth embodiments, respectively, of the invention;

FIG. 19 is a schematic view according to an eleventh embodiment of the invention;

FIG. 20 is a transverse cross-sectional view of a rim according to a twelfth embodiment of the invention;

FIG. 21 is a schematic view showing manufacturing the rim of FIG. 20;

FIG. 22 is a transverse cross-sectional view of a rim according to an alternative of the twelfth embodiment of the invention.

DETAILED DESCRIPTION

Figure 1:
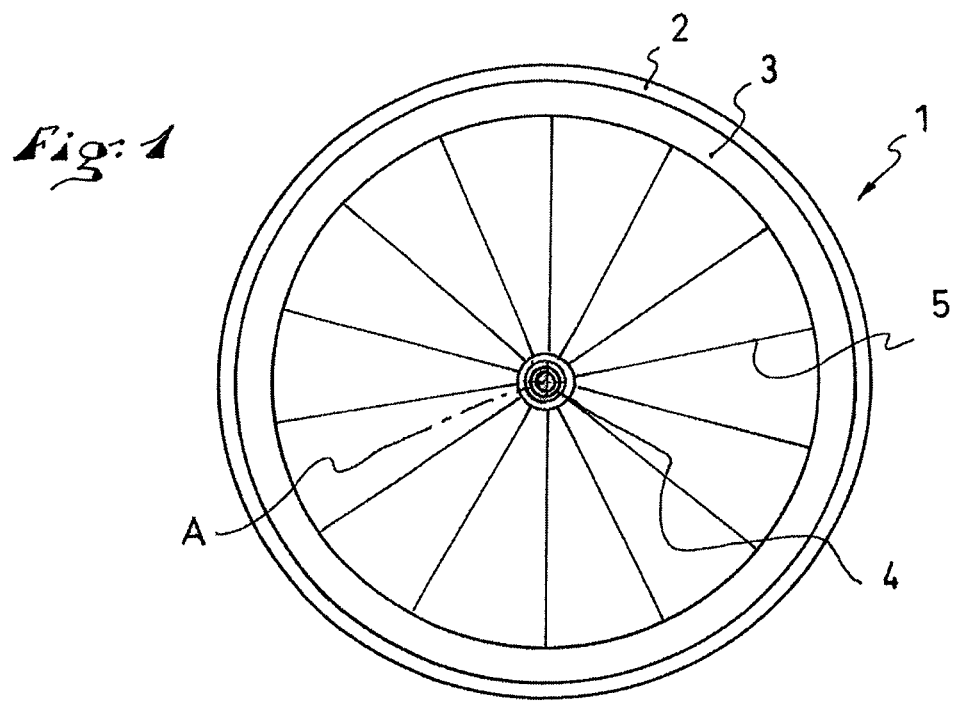
FIG. 1 is a view of a cycle wheel rim comprising a rim element according to a first embodiment of the invention.

The wheel 1 shown in FIG. 1 is adapted to be mounted on a bicycle and is equipped with a tire 2. In the context of this disclosure, a tire may be a wire or bead tire, sometimes referred to as a clincher tire, adapted to cooperate with corresponding projections or lips of a rim, or a tubular tire, sometimes referred to as a sew-up or glue-on tire, which is glued onto the rim. The wheel is shown in side view, the plane P of the wheel being the plane of the drawing.

The wheel 1 comprises a rim 3, at least one ring-shaped element made of composite material, and a hub 4, centered on the A-axis and adapted to be fixed to the frame or fork of a bicycle. The invention also applies to wheels and rims intended for other transportation means that use wheels similar to those of a bicycle, a tricycle, a quadricycle, a wheelchair, etc.

Spokes 5 connect the hub 4 to the rim 3. The spokes and the hub can also be made of composite material or a metallic alloy (such as alloys of steel, aluminum, titanium, etc.). In the context of this disclosure, composite material is intended to refer to a material in which fibers are embedded in a matrix. An example of composite material is achieved by draping pieces of woven filaments impregnated with epoxy resin, each filament being comprised of carbon fibers.

Figure 2:
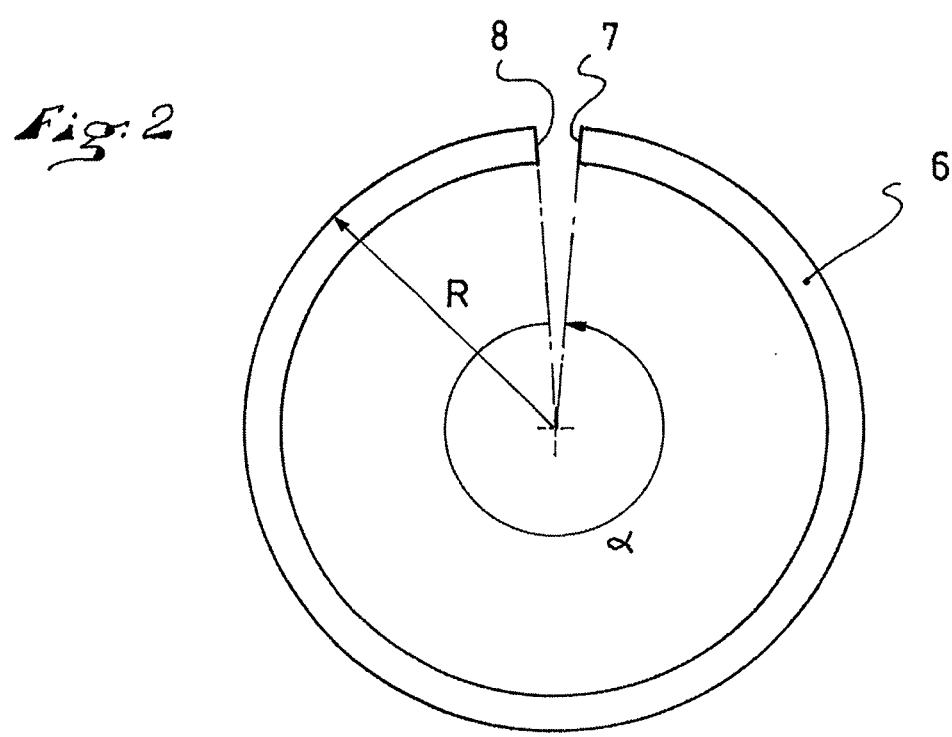
FIG. 2 is a side view of the rim element of FIG. 1.

FIG. 2 shows a blank 6 of the rim 3. The blank 6 corresponds to a section of a solid of revolution about an axis A, the A-axis being the axis of rotation of the final wheel, i.e., the wheel after completion of manufacture. The cross section of the rim along an axis containing the A-axis corresponds to the final profile of the rim and is described in detail with reference to FIG. 3. The radius of curvature R of the blank corresponds to half the standardized final diameter of the rim.

According to the invention, the rim blank is made in a single portion, i.e., a one-piece portion, out of composite material and comprises a first end 7 and a second end 8. Between the two ends 7, 8 the blank 6 forms an angular section having an angle $\alpha=360°$. For reasons of clarity of the drawing, the two ends 7 and 8 have been spaced apart in FIG. 2.

In an alternative embodiment of the invention, not shown, the $\alpha$ is slightly less than 360°, particularly ranging between 350° and 360°. In this alternative embodiment, each of the ends 7 and 8 of the blank 6 is in contact with an insert having the same profile as the blank, i.e., the same transverse cross section as the blank.

FIG. 3 is an exploded perspective view of various elements used in assembling the rim 3.

The profile of the blank 6 is that of the final rim. It is comprised of an upper bridge 9 and a lower bridge 10 connected to one another by two lateral surfaces 11, or sidewalls, thereby demarcating a hollow body 17. The flanges 12 extend the lateral surfaces beyond the upper bridge up to the lips 13 provided for retaining the tire beads. The blank is cut beforehand at both ends 7 and 8, so that the total length of the periphery of the blank at the base of the flanges 12, on the inner side (surface supporting the tire beads), is one of the values recommended by the ETRTO standard (a standard of the European Tyre and Rim Technical Organisation), for example 622 mm.

A sleeve 14 is also prepared beforehand. In the illustrated embodiment, the sleeve 14 is a hollow structure made of composite material. The sleeve has an outer cross-sectional profile identical to the inner cross-sectional profile of the hollow body 17 defined by the lower and upper bridges and the lateral surfaces. In the illustrated embodiment, the sleeve 14 has a curvature that is equivalent to the radius of curvature R of the rim.

The length L of the sleeve is relatively small compared to the length of the circumference of the blank, which is about 2 m. In practice, the length of the sleeve can range between 10 and 100 mm. Because of the short length of the sleeve, if the material used for making the sleeve has a certain elasticity, a straight sleeve can be used, i.e., a sleeve having no curvature.

In the event the sleeve is made of composite material, it is advantageous to manufacture it by pultrusion. However, a sleeve of the invention can be made of a different material and/or by using any other technique.

The preliminary preparation of the blank also includes machining the housing 16 in the inner surfaces of the flanges 12. The dimensions of the housings 16 are provided so that additional reinforcements 15 can be embedded and be flush with the inner surfaces of the flanges 12. As shown in the drawings, each of the reinforcements can take the form of a rectangular plate, such as a rigid plate made of metal or metallic alloy, for example, although other shapes and materials are within the scope of the invention.

The sleeve 14, the reinforcements 15, and the glue to be used constitute all of the parts for assembling the blank 6; they can be referred to as an assembling device or mechanism.

After the blank 6, the sleeve 14, and the reinforcements 15 are prepared, the rim 3 can then be assembled. In this regard, the sleeve 14 is inserted and glued into the first end 7, and is then inserted and glued into the second end 8, so that the front surfaces of the two ends 7 and 8, i.e., their facing surface, are in contact with one another, i.e., the two surfaces are placed in an abutting relationship. Tools can be used to retain the two ends 7 and 8 in position and to ensure their alignment.

The assembly carried out by the sleeve 14 provides relatively large fixing surfaces that ensure a very good cohesion between the two ends of the blank. For example, for a rim in which the inner circumference of the hollow casing is 80 mm and a sleeve is 40 mm in length, there is a contact surface of 1600 mm$^2$ for each of the ends. In any case, whether the assembly is achieved using a glued, co-laminated sleeve (described below) or using a pin, the tensile strength of the two ends with respect to one another is greater than 100 MPa.

The reinforcements 15 are then positioned in their housing by gluing. They provide rigidity to the junction between the portion of the flange 12 extending from the first end 7 of the blank 6 and that extending from the second end 8.

In alternatives of the first embodiment of the invention, additional reinforcements are also or exclusively positioned on the outer surfaces of the flanges 12.

FIG. 16 shows an alternative to the embodiment of FIG. 3, in which, as for the rim described with reference to FIG. 3, the profile of the blank 6 is that of the final rim. The preparation of the blank prior to the assembly includes making holes 100 in the lips 13. In a particular embodiment, these holes 100 are blind holes drilled into the unidirectional fibers that are in the lips.

During assembly of the two ends of the blank 6, a sleeve 14 identical to that described above and pins 101 are used for to the upper portion of the rim. The pins 101 are glued into the holes 100. They can be metallic (aluminum, titanium, steel, etc.) or composite (carbon epoxy, glass epoxy, etc.). In the case in which the pins are made of composite material, they can be made from unidirectional fibers.

The embodiment shown in FIG. 16 provides a mechanical continuity in the area of the lips, without excess thickness on the inner surfaces of the lips (in contact with the tire) or on the outer surfaces (in the area of the braking zone).

FIG. 4 is a cross-sectional view of a rim according to a second embodiment of the invention. For simplicity, all of the elements of this rim that are similar to those described in the first embodiment are designated by the same reference numerals and may not be specifically shown in FIG. 4.

The cross section is taken along a plane perpendicular to the plane P of the wheel and extending through the A-axis of the wheel, the cutting plane passing in the vicinity of the junction between the two ends 7 and 8 of the blank 6. It is thus possible to see the profile of the blank 6 and that of the sleeve 14. As in the first embodiment, the profile of the blank 6 is comprised of a lower bridge 10, an upper bridge 9, lateral surfaces or walls 11, and flanges 12. However, in this case, the profile is characterized by the shape of the hollow body 17. The hollow body 17 includes a lower portion 171 which, as in the previous embodiment, is opposite the lateral surfaces 11, and two upper lateral portions 172, which are opposite the flanges 12. Because the lateral surfaces 11 rise above the upper bridge 9, in the context of FIG. 4, they are connected directly to the flanges 12 via a plate 18. The hollow space defined between the upper portion of the lateral surface 11 and the flange 12, i.e., the upper lateral portion 172, is contiguous with the remainder of the hollow body, i.e., the lower portion 171.

Advantageously, the profile of the sleeve 14 precisely fits the dimensions of the hollow body 17 of the blank 6 and includes two edges 19 whose shape is complementary to that of the upper lateral portion 172. These edges 19, as shown in FIG. 4, can be hollow or, if the depth of the plate 18 is too small, can be solid. Regardless of their shape or thickness, the edges 19 improve the rigidity of the sleeve and, therefore, the rigidity of the final rim. They make it unnecessary to position reinforcements, such as the reinforcements 15 described for the preceding embodiment. They make it possible to produce a thinner sleeve and, therefore, they provide a generally lighter wheel.

Figure 5A:
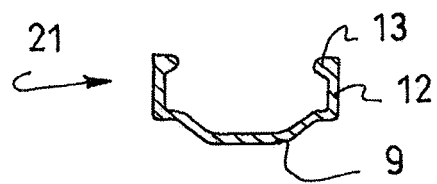
FIGS. 5a, 5b, and 5c are cross-sectional views of rim portions.
Figure 5B:
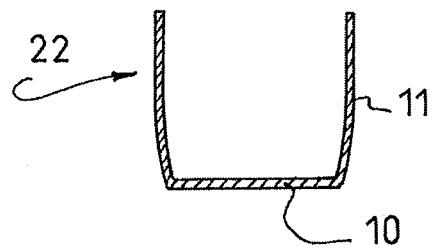
Figure 5C:
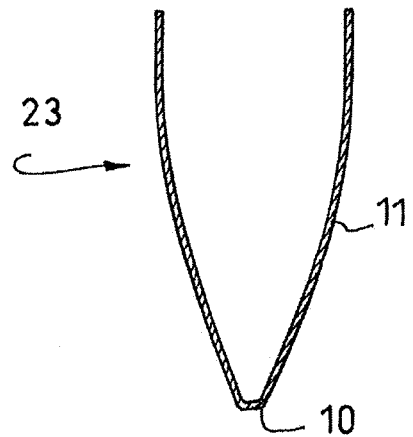

FIGS. 5a, 5b, and 5c are cross-sectional views of rim elements that can be made according to the invention.

These elements can be combined with one another or be supplemented with other components to produce a rim blank 6. The two ends 7 and 8 of the blank are then connected to one another to finalize the rim as described with reference to FIG. 3.

According to the invention, each of the elements shown in FIGS. 5a, 5b, and 5c is a cross section of a solid of revolution about axis A, which constitutes, between its two ends, an angular section having an angle α of 360°.

In FIG. 5a, the first element 21 has a profile comprising an upper bridge 9 and two flanges 12 at the ends of which are lips 13.

In FIGS. 5b and 5c, the second element 22 and third element 23, respectively, have a profile comprising a lower bridge 10 and two lateral surfaces, or sidewalls, 11.

The elements shown in FIGS. 5a, 5b, and 5c can be associated with rim portions that are not produced by pulforming to make a rim according to the invention. For example, the third element shown in FIG. 5c can be associated with an aluminum rim portion produced from an extruded, bent, and then welded, profile element. Various elements produced by pultrusion can also be combined with one another, as described below.

Figure 6:
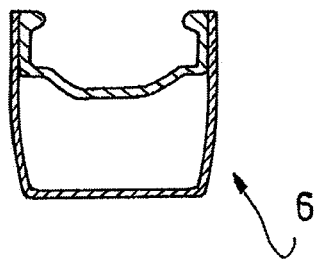
FIG. 6 is a cross-sectional view of a rim according to a third embodiment of the invention.

FIG. 6 shows a third embodiment of the invention, in which the blank 6 is formed by the assembly of the first element 21 of FIG. 5a with the second element 22 of FIG. 5b. The assembly of the first and second elements is carried out by gluing, so that the resulting subassembly is configured as the blank shown in FIG. 2, that is to say, so that it has a first end 7 and a second end 8 separated by the angular arc of 360° formed by the body of the blank 6. The two ends are then joined as described above to obtain the final rim. A so-called "shallow rim" is produced by assembling the first element 21 and second element 22.

Figure 7:
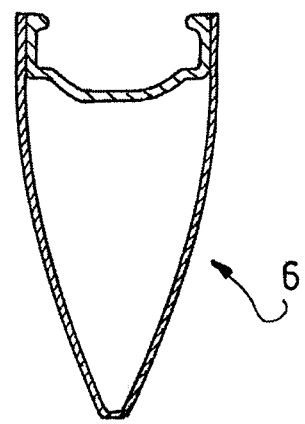
FIG. 7 is a cross-sectional view of a rim according to a fourth embodiment of the invention.

FIG. 7 shows a fourth embodiment of the invention, in which the blank 6 is formed by assembling the first element 21 of FIG. 5a with the third element 23 of FIG. 5c. A so-called "deep rim" is produced after the two ends 7 and 8 of the resulting blank are joined, as described above.

Figure 8:
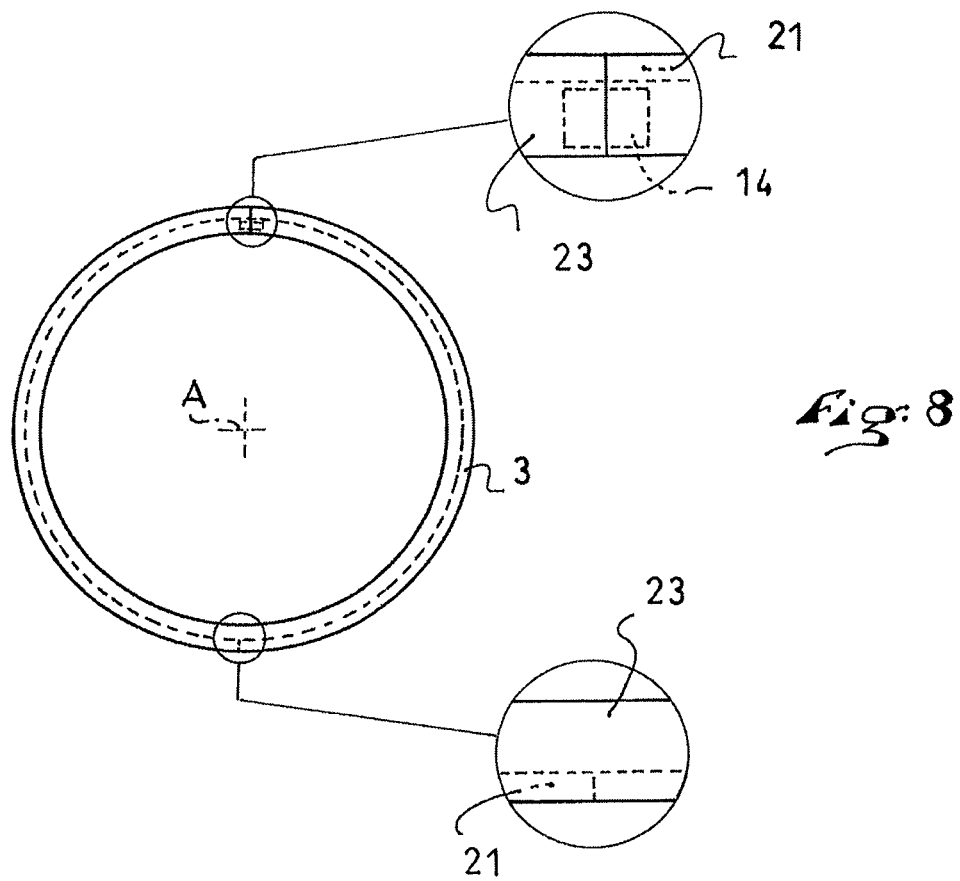
FIG. 8 is a side view of a rim according to a fifth embodiment of the invention.

FIG. 8 illustrates a fifth embodiment of the invention, in which the rim is similar to that of the fourth embodiment of the invention, produced by assembling the first element 21 of FIG. 5a with the third element 23 of FIG. 5c. In addition to the operations for making the first element 21 and the third element 23, the method of manufacturing a rim according to the fifth embodiment of the invention includes an operation of connecting the two ends of the third element 23 in order to obtain a partially closed rim. This operation of connecting the third element 23 is carried out in a manner similar to those described above with reference to the reinforcement 15 and/or to the sleeve 14.

The next operation involves positioning the first element 21 within the partially closed rim, obtained from the previous operation; connecting the two ends of the first element 21, so that the parting line of the two ends of the first element 21 does not merge with the parting line of the two ends of the third element 23; and gluing the assembly. In this last operation, it is not necessary to position reinforcements similar to the reinforcements 15 provided in the previous embodiments to ensure a complete junction between the two ends in the area of the flanges 12, because this function is already fulfilled by the third element 23. Indeed, the third element 23 is continuous in the area of junction of the ends of the first element 21.

In the embodiment shown in FIG. 8, the parting lines of the first and third elements are diametrically opposed. They could also simply be offset by a few degrees and be diametrically opposed to the location provided of the inflation valve of the tire.

Figure 9:
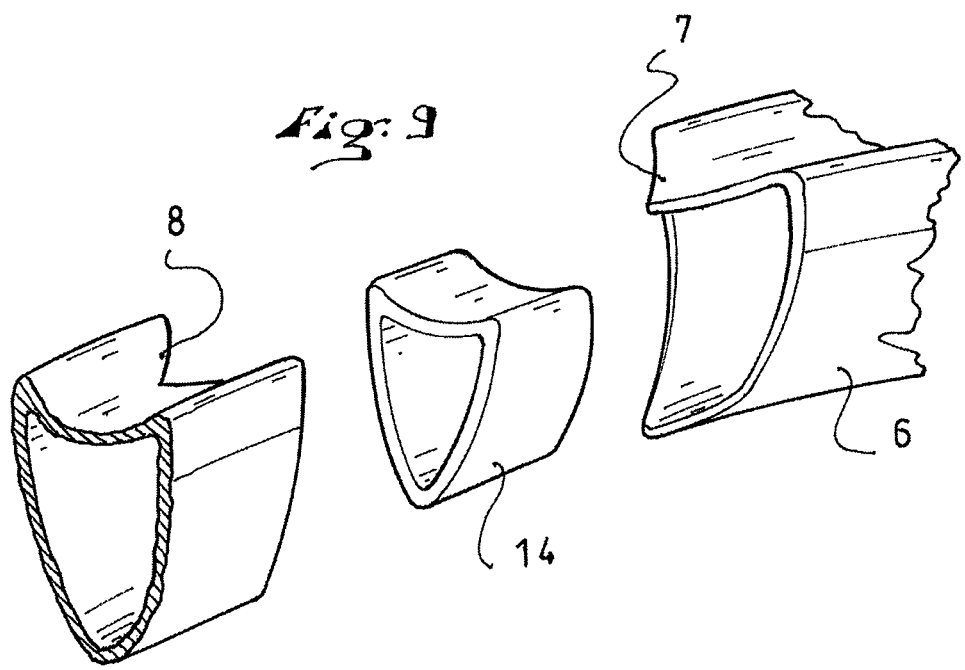

FIG. 9 shows the assembly of a blank 6 for making a rim according to a sixth embodiment of the invention. This is a rim adapted to receive a tubular tire. The first end 7 of the blank 6 is sectioned in a direction perpendicular to the A-axis, along a convex chevron, or V-shaped, profile. The second end 8 is similarly sectioned along a concave chevron, of V-shaped, profile that is directly complementary to that of the first end. The two ends 7 and 8 are thusly shaped to nest with one another completely, and a sleeve 14, similar to the sleeve described with reference to FIG. 3, completes the assembly. In this embodiment, the connection between the two ends 7 and 8 is particularly strong, particular against lateral forces. As alternatives to the chevron or V-shape, the ends 7, 8 could be formed as complementary U-shapes or V-shapes having slightly rounded points or ends.

FIG. 10 shows the assembly of a blank 6 for making a rim according to a seventh embodiment of the invention. This is a rim provided for mounting a wire tire, i.e., a clincher tire. In this embodiment, the two ends 7 and 8 are sectioned along a plane perpendicular to the A-axis. The angle α, corresponding to the angular extent of the blank 6 between the first end 7 and the second end 8, is slightly greater than 360°.

The first end 7 is machined in the area of the inner surface of the flanges 12 so as to provide housings 16. The second end 8 is also machined in its entire front surface, except in the area of the inner surface of the flanges 12, so as to form two tongues 20 projecting from the second end 8. The two tongues 20 are shaped to complement the housings 16 and are adapted to nest into them. After the two ends 7 and 8 are machined, the angular extension of the blank 6, without taking the tongues 20 into account, has a value of 360°. The assembly is completed by a sleeve 14 which, in a manner like that described with reference to the previous drawing figures and embodiments, is inserted into the hollow body 17 of the two ends 7 and 8.

In an alternative of the seventh embodiment of the invention, the machining of the first end 7 is not limited to providing housings 16 in the inner surface of the flanges 12, but also includes the machining of a peripheral housing over the entire inner surface of the hollow body 17 to a depth "p" ranging from a few millimeters to several tens of millimeters. Also, the second end 8 is machined so that, not only tongues 20 project from the flanges 12 but also a collar extends the inner portion of the upper bridge 9, the lower bridge 10 and the sidewalls 11. The collar is adapted to be inserted into the peripheral housing provided at the first end 7. In this alternative, neither the sleeve nor additional reinforcements are necessary.

FIG. 11 shows the assembly of a blank 6 for making a rim according to an eighth embodiment of the invention. This is a rim provided for mounting a wire tire, i.e., a clincher tire. In this embodiment, the two ends 7 and 8 are sectioned along a plane perpendicular to the A-axis. The angle α, corresponding to the angular amplitude of the blank 6, between the first end 7 and the second end 8, is slightly less than 360°, while being greater than 350°.

The first end 7 and second end 8 are machined in the area of the inner surface of the flanges 12 so as to provide housings 16.

Prior to assembly, an intermediate element 35 is prepared. This element is can be made of carbon or of a compatible plastic or composite material for bonding with the blank 6. This element has a central portion 36 having exactly the same outer contour as the cross section of the blank 6. The central portion 36 is structured and arranged to be interposed between the first and second ends 7, 8 of the blank. The intermediate element 35 also includes two collars 37 and four tongues 38. The tongues 38, which project from each side of the central portion 36, are inserted into the housings 16 provided in the inner surfaces of the flanges 12 and are glued in order to ensure the assembly in the area of the flanges 12. The outer contour of the collars 37 is identical to the inner contour of the hollow bodies 17, and the collars are glued to the latter. In the illustrated embodiment, the intermediate element 35 is the seat for the tire inflation valve 43.

FIG. 17 shows a ninth embodiment of the invention. The blank 6 is first made by pultrusion and then sectioned to size. The sleeve 14 used to assemble the two ends 7 and 8 of the blank 6 is comprised of a core 102 made of expansible foam and wrapped in an envelope 104 made of resin-preimpregnated carbon fabric. The sleeve 14 is positioned in the blank 6 prior to the curing cycle, in the position shown in FIG. 17. The two ends 7 and 8 are brought into contact with one another and retained throughout the curing process. Due to the heat, the foam expands and applies the lamination pressure of the preimpregnated fabric of the envelope 104 against the inside of the pultruded profile element.

FIG. 18 shows a tenth embodiment of the invention. In a manner similar to that implemented for the ninth embodiment, the sleeve includes an envelope 104 comprised of carbon fabric pre-impregnated with resin. The lamination pressure is exerted via an inflatable bladder 103 to which a nozzle 105 is attached. The nozzle, which is non-extensible, makes it possible to supply the bladder 103 from the outside of the rim.

In the ninth and tenth embodiments of the invention, reference is made to partial co-lamination because, as the envelope 104 of the sleeve 14 is laminated and becomes a structural element while, pre-impregnated, it has no rigidity, it is also solidly fixed to the inner surfaces of the pultruded profile element. The co-lamination of the sleeve can be preferred over the lamination of the sleeve and assembly of the blank in several operations. Indeed, this makes it possible to optimize and reduce the quantities of resin, and to reduce the interface zone between the sleeve and the pultruded profile element to the minimum. In addition, this eliminates the need for additional adhesive.

FIG. 19 shows an eleventh embodiment of the invention, in which a blank 6 is initially made in the form of a hollow pultruded profile element. This profile element can be made of carbon. Such blank has thin walls not having adequate mechanical properties to enable it to constitute, by itself, a bicycle wheel rim. The two ends of the blank are assembled according to one of the methods described above in order to produce a closed hoop 107. The closed hoop 107 is used to manufacture the final rim according to the method of draping layers 106 of pre-impregnated carbon fabric around the closed hoop. The curing cycle achieves the partial co-lamination of the fabric layers on the closed hoop 107. Thus, the final rim is formed by a first element, the pultruded core, and a structural skin enveloping the core and constituting, for example, the upper portion of the rim (lip, rim base). This manufacturing method substantially improves upon the current methods for manufacturing rims by draping pre-impregnated fabrics, because the core around which the layers are draped is comprised of an element that has the same mechanical properties as the layers. Other alternatives of the eleventh embodiment are possible. For example, a first element can be made by pultrusion, and such first element is then assembled using a sleeve so as to form the upper portion and the lower portion, respectively, of the rim. Next, the lower portion and upper portion, respectively, can be made via draping.

FIG. 20 shows a twelfth embodiment of the invention. The blank 6 is made by pultrusion, and its two ends are assembled according to one of the techniques described above to obtain a closed hoop. In the area of the upper bridge, the profile of the hoop forms two grooves 115 and 116 that are located along the edges of the upper bridge and have an opening turned outward. The grooves define two annular volumes that are included in the overall volume defined by the casing of the hoop and are setback along a radial direction relative to the tire. For example, as shown in FIG. 20, the wall of the hoop which forms the upper bridge 109 is interrupted in the vicinity of the lateral walls, and it is extended by two connecting walls 117 and 118 joining the lateral walls and setback relative to the top of these walls. Thus, the connecting walls and the upper portion of the lateral walls demarcate the two grooves.

The two grooves 115, 116 are filled with two windings 119 and 120. The windings are formed by winding a continuous fiber, such as a glass, carbon, or aramid fiber, which is embedded in a resin matrix. The fibers are formed, for example, by strands of continuous carbon filaments. It can include between several tens and several thousands of filaments. The fiber can be formed by a multitude of broken yarns, i.e., element yarns having a length of several centimeters, which are entangled with one another similar to a rope. The fiber can also be formed by a braid in which all of the filaments are oriented along a direction close to the longitudinal direction defined by the fiber.

FIG. 21 schematically illustrates an embodiment of the windings 119 and 120. According to this embodiment, the hoop 113 is mounted on a plate 123 which is rotationally movable about a shaft 124. For example, the hoop is immobilized on the plate using catches or clamps 125a, 125b, 125c, and 125d, which are movable along radial directions relative to the axis of the shaft. Two fiber strands 127 and 128 are drawn from the feed rollers 129 and 130. The strands are redirected by means of deflection pulleys, for example, into a tank 132 filled with resin, in order to become impregnated with resin; the strands are then again guided by deflection pulleys so as to be presented in the plane of each of the grooves, respectively. A drying device 133, for example comprised of two rollers pressed against one another to drain any excess resin, can be provided at the outlet of the tank. The fibers can then be tensioned in order to compact the fibers and the resin. Any suitable expedient can be used to maintain this tension. And it is to form the windings under tension that the grooves are open outward in this case. To produce the windings, the hoop is immobilized on the plate; and the end of the fibers is attached to the hoop by any appropriate expedient. For example, the ends are glued to the bottom of the grooves using an adhesive, or the ends are threaded into a hole or a slit provided for this purpose on the hoop; other means can also be used. After the ends of the yarns are attached to the hoop, the plate is rotationally driven in order to produce the windings 120 and 121. Once the windings are made, the fibers are cut and the ends are interrupted by any appropriate means, such as an adhesive, for example. The resin is then polymerized. Depending upon the type of resin used, polymerization occurs at room temperature or is accelerated via external heating. Heat can be provided by any appropriate expedient; for example, the hoop of the rim can be heated prior to the winding operation, or infrared heating lamps can be used, or the curing process can be carried out in an oven. During polymerization of the resin, the rim can be maintained in a rotational movement to avoid local concentration of resin due to gravity.

Rim finishing operations as well as various machining operations are possible. Furthermore, a number of variations are possible. Instead of fibers coated with moist resin, the invention could utilize fibers including a mixture of dry fibers and thermoplastic fibers that are heated at the outlet of the feed roller, or fibers pre-impregnated with polymerized resin, whose polymerization reaction is blocked by storage at low temperature.

FIG. 22 shows an alternative of the twelfth embodiment, in which the winding 119 is positioned on the rim base 121.

Figure 12:
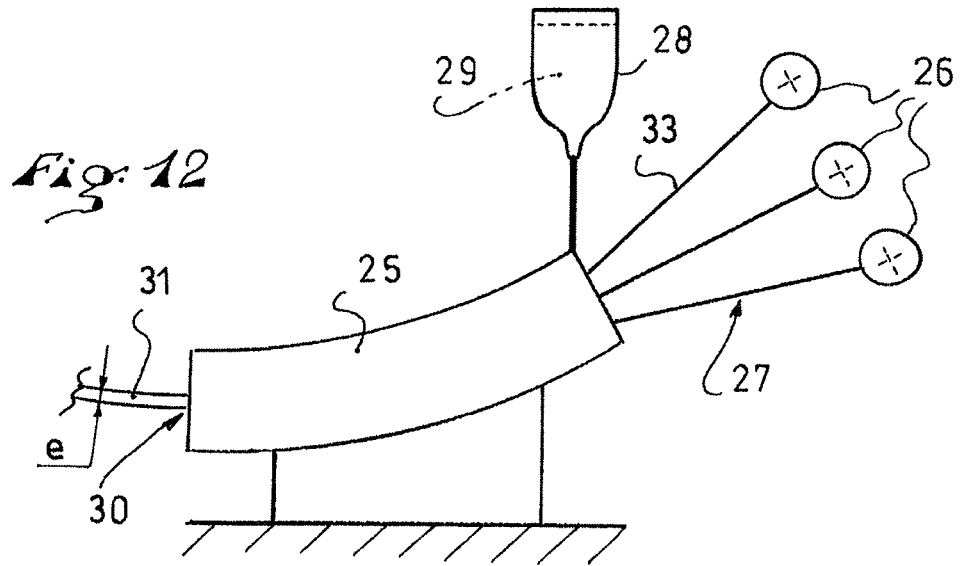
FIG. 12 is a schematic view of a method of manufacturing a wheel rim element according to the invention.

FIG. 12 schematically shows a method for producing the blank 6 of a rim according to the invention. The pultrusion machine 25 is supplied by one or more or several fabric layers 27, on the one hand, and by the resin 29, on the other hand. The machine can also be supplied by nonwoven layers, by yarns 33, or by fibers. The fabric layers 27 and the yarns 33 are unwound from spools 26, whereas the resin is fed from a reservoir 28. The fabrics, nonwoven layers, yarns, or fibers are impregnated with resin by passing through a bath or an impregnation chamber, or by spraying, and are pulled through a heated die that controls the resin content and determines the shape of the cross-section. In the method recommended for the manufacture of a rim element according to the invention, the die provides the profile element with a curved shape. The passage in a zone of the heated die causes the thermosetting resin to polymerize and provides the profile element with its final shape. The materials used are carbon, glass fiber, or any other fiber.

At the outlet 30 of the machine 25, a continuous flow of a curved profile element 31 is ejected from the machine. The profile element has a height "e", so that one cannot refer to only one radius of curvature for the profile element 31. However, reference is made to a mean radius of curvature "r". The mean radius of curvature of the profile element substantially ranges between 250 and 340 mm. In the embodiments described above, the mean radius of curvature of the profile element, which corresponds to the radius of curvature of the base of the inner surface of the flanges 12, at the junction with the upper bridge 9, is substantially equal to 311 mm.

The profile element 31 is sectioned to the desired length so that it forms, between its two ends, a body of revolution whose extension fits into an angular arc "a" greater than 350°. This body of revolution constitutes the blank 6 mentioned above. In the embodiments such as that described with reference to FIG. 3, the angle "α" is substantially equal to 360°. In the embodiments such as that described with reference to FIG. 10, the angle "α" is substantially greater than 360°; and in the embodiments such as that described with reference to FIG. 11, the "α" is substantially less than 360°.

The process of pultruding a curved profile element, which is then sectioned to produce a rim blank, is particularly advantageous over the current methods for manufacturing bicycle wheel rims made of composite material, for a number of reasons. First, the method for obtaining a curved profile element is a continuous process, which provides a much greater manufacturing speed. In addition, the excess resin is not lost but can be directly recycled during impregnation of the fabrics, which takes place right in the pultrusion machine. Moreover, the fabrics are used optimally in this process. Indeed, contrary to the common methods of manufacturing a composite rim, there is no other loss of fabric than that due to the various machining operations. The fabrics used during pulforming result from weaving yarns, each of these yarns being comprised of a multitude of filaments or fibers of a material such as glass or carbon. Pulforming ensures the continuity of a number of yarns forming the fabric, from the first end 7 of the blank 6 to the second end 8, i.e., over a length ranging between 1.5 m and 2.5 m, and in the case of the embodiments described above, over a length of about 2 meters.

Another advantage of the method of producing a rim or a rim portion according to the invention is the possibility of directly making blanks having a hollow casing, which is difficult to achieve with the currently known methods for making composite rims, or unless provided with a degradation of the stiffness/weight ratio.

In the various embodiments of the invention, to benefit from a rim having the greatest stiffness/weight ratio possible, the use of resin is limited with respect to the fibers. Upon exiting from the machine 25, the fibers can correspond to at least 50% of the weight of the blank. In the case of a blank made of carbon fibers embedded in a thermosetting matrix, such as an epoxy resin, good results are obtainable with a fiber content ranging between 55% and 75% of the weight of the blank.

Figure 13:
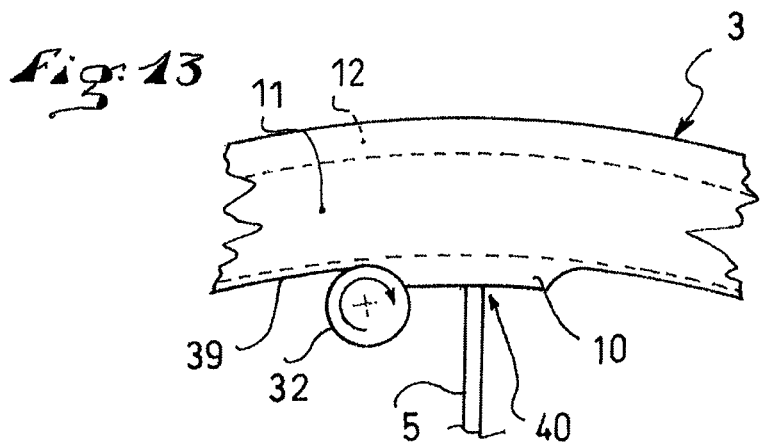
Figure 14:
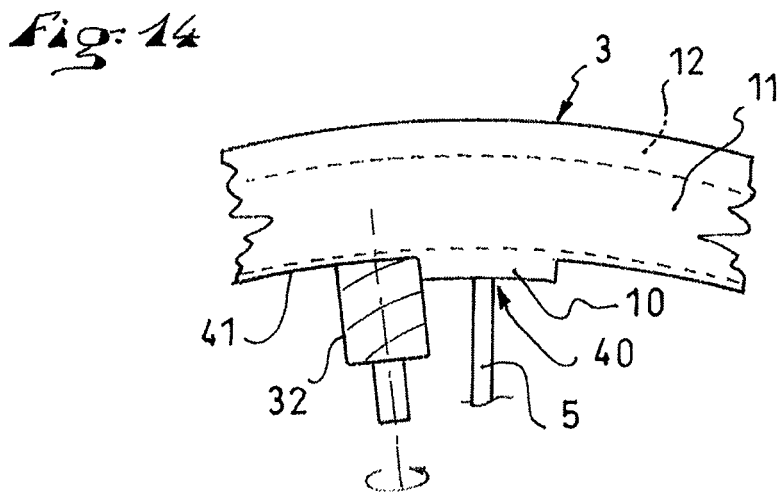

FIGS. 13, 14, and 15 illustrate additional manufacturing operations that can be added to the manufacturing steps described above.

According to FIGS. 13 and 14, an additional operation is a partial machining of the rim in order to modify the geometry thereof as a function of the desired final characteristics; for example to reduce thickness in all the zones in which substantial thickness and strength are not required. This reduction in thickness may be undertaken to reduce the thickness of the lower bridge 10 using a cylindrical, double-sided milling cutter 32.

In FIG. 13, the periphery of the milling cutter 32 is used to machine a gradual reduction 39 of the lower bridge 10 between the anchoring points 40 of the spokes 5. This machining can be performed prior to attaching the spokes 5. After this machining, the local thickness of the walls of the rim, on which the machining is performed, can be as small as 0.3 mm, whereas the thickness of the walls that are not machined would have a thickness between 0.8 and 5 mm.

In FIG. 14, the flat surface of the milling cutter 32 is used to machine a shouldered reduction 41 of the lower bridge 10 between the anchoring points 40 of the spokes 5. Such reductions can be machined in other locations on the rim, especially on the lateral surfaces 11. The outer surfaces of the flanges can also be machined to prepare the braking surfaces.

In FIG. 15, an additional operation reinforces the anchoring points 40 of the spokes 5 with one or more pieces of fabric. This operation makes it possible to produce a blank with minimum thickness, which is subsequently reinforced in the areas in which substantial stiffness is required. The reinforcement pieces 42 can be affixed to the lower bridge 10 and/or to the sidewalls 11.

In addition to the foregoing, the invention illustratively disclosed herein suitably may be practiced in the absence of any element which is not specifically disclosed herein.

The invention claimed is:

1. A rim for a cycle wheel having an axis of rotation, said rim comprising:
    a first curved pultruded element in the form of a section of a solid of revolution about an axis;

the first element being a single unitary piece of composite material and comprising a first end and a second end distinct from one another;

the first element constitutes, between the first end and the second end, a section of a solid of revolution having an angular arc greater than 350°;

the composite material of the first element comprises embedded fibers, the fibers constituting at least 50% of the weight of the first element;

the rim having an upper bridge, a lower bridge, and a pair of lateral sidewalls connecting the upper and lower bridges demarcating a hollow body, said hollow body comprising, at least in part, the first element.

2. A rim according to claim 1, wherein:
the composite material of the first element comprises a thermosetting matrix.

3. A rim according to claim 1, further comprising:
glue assembling the first end to the second end.

4. A rim according to claim 1, further comprising:
a closed cross-sectional portion;
an assembly device constructed and arranged to assemble together the first and second ends, said device comprising a sleeve positioned within the closed cross-sectional portion.

5. A rim according to claim 1, further comprising:
an assembly device constructed and arranged to assemble together the first and second ends;
said assembly device comprising at least one reinforcement extending between the first and second ends.

6. A rim according to claim 1, further comprising:
an assembly device constructed and arranged to assemble together the first and second ends;
said assembly device comprising at least one reinforcement plate extending from within an inner surface of the first end and from within an inner surface of the second end.

7. A rim according to claim 1, further comprising:
an assembly device constructed and arranged to assemble together the first and second ends;
said assembly device comprising at least one pin extending between the first and second ends.

8. A rim according to claim 1, further comprising:
a second element in the form of a section of a solid of revolution about the axis;
the second element being a single unitary piece of composite material and comprising a first end and a second end distinct from one another;
the second element constitutes, between the first end and the second end, a section of a solid of revolution having an angular arc greater than 350°.

9. A rim according to claim 1, wherein:
the first end and the second end have been machined to have complementary shapes, said complementary shapes being constructed and arranged to enable one of the ends to nest within the other of the ends to close the rim.

10. A rim according to claim 1, wherein:
the first element comprises a core;
the rim further comprises a structural skin at least partially covering said core.

11. A method of manufacturing a cycle rim, said method comprising:
pultruding at least one curved element in the form of a section of a solid of revolution about an axis;
the one element comprising a first end and a second end and constituting, between the two ends, a section of a solid of revolution having an angular arc greater than 350°;
preparing a rim blank from at least the one element, said preparing including machining;
preparing a blank assembling device to assemble together the two ends of the blank;
assembling together the two ends of the blank.

12. A method of manufacturing a rim according to claim 11, wherein:
the blank includes a hollow body;
the preparing the blank assembly device includes manufacturing a sleeve.

13. A method of manufacturing a rim according to 11, wherein:
the blank includes two lateral flanges;
the blank assembly device includes reinforcements.

14. A method of manufacturing a rim according to claim 11, wherein:
the assembling together the two ends of the blank comprises gluing together the two ends.

15. A method of manufacturing a rim according to claim 11, wherein:
the assembling together the two ends of the blank comprises co-lamination.

16. A method of manufacturing a rim according to claim 11, wherein:
the pultruding comprises forming a lower bridge;
the preparing a rim blank includes a step of machining the lower bridge in zones between anchoring points structured and arranged for connecting spokes to the rim.

17. A method of manufacturing a rim according to claim 16, wherein:
the preparing a rim blank further comprises reinforcing the anchoring points of the spokes by mounting reinforcing panels onto the rim blank.

18. A method of manufacturing a rim according to claim 11, further comprising:
covering the blank with layers of composite fabric to produce a final rim.

* * * * *